(12) United States Patent
Okada

(10) Patent No.: US 10,101,741 B2
(45) Date of Patent: Oct. 16, 2018

(54) UNMANNED AERIAL VEHICLE, CONTROL METHOD, AND RECODING MEDIUM

(71) Applicant: Panasonic Intellectual Property Corporation of America, Torrance, CA (US)

(72) Inventor: Masashi Okada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/598,703

(22) Filed: May 18, 2017

(65) Prior Publication Data

US 2017/0344002 A1 Nov. 30, 2017

(30) Foreign Application Priority Data

May 30, 2016 (JP) .................................. 2016-107139
Jan. 25, 2017 (JP) .................................. 2017-011431

(51) Int. Cl.
| G05D 1/00 | (2006.01) |
|---|---|
| B64C 39/02 | (2006.01) |
| G08G 5/00 | (2006.01) |
| G08G 5/02 | (2006.01) |
| H04B 7/185 | (2006.01) |

(52) U.S. Cl.
CPC ......... *G05D 1/0022* (2013.01); *B64C 39/024* (2013.01); *G05D 1/0016* (2013.01); *G08G 5/006* (2013.01); *G08G 5/0013* (2013.01); *G08G 5/0021* (2013.01); *G08G 5/0039* (2013.01); *G08G 5/0069* (2013.01); *G08G 5/0086* (2013.01); *G08G 5/025* (2013.01); (Continued)

(58) Field of Classification Search
USPC .......................................................... 701/2
See application file for complete search history.

(56) References Cited

U.S. PATENT DOCUMENTS

| 9,524,648 | B1 * | 12/2016 | Gopalakrishnan ...... B64C 39/00 |
| 2012/0210853 | A1 * | 8/2012 | Abershitz ................ B64F 1/04 89/1.11 |

(Continued)

FOREIGN PATENT DOCUMENTS

JP 2003-018673 1/2003

*Primary Examiner* — Tyler D Paige
(74) *Attorney, Agent, or Firm* — Greenblum & Bernstein, P.L.C.

(57) ABSTRACT

An unmanned aerial vehicle includes: a memory that stores first information acquired and second information acquired, the first information indicating the current position of the unmanned aerial vehicle, the second information indicating the current position of a manipulation device that transmits a command to remotely manipulate the unmanned aerial vehicle; a receiver that receives information transmitted from a transmission source, the information including an emergency warning; a processor; and a controller that controls the unmanned aerial vehicle. The processor compares a target region which is indicated in the information and for which the emergency warning is intended and the current position of the unmanned aerial vehicle and compares the target region and the current position of the manipulation device. The controller evacuates the unmanned aerial vehicle in accordance with the results of the comparisons.

16 Claims, 12 Drawing Sheets

(52) U.S. Cl.
CPC .... *B64C 2201/12* (2013.01); *B64C 2201/146* (2013.01); *H04B 7/18506* (2013.01)

(56) References Cited

U.S. PATENT DOCUMENTS

| | | | |
|---|---|---|---|
| 2012/0212570 A1* | 8/2012 | Herz | G06Q 10/103 348/14.08 |
| 2016/0189548 A1* | 6/2016 | Thurling | G08G 5/0013 701/3 |
| 2016/0318615 A1* | 11/2016 | Pick | B64C 39/024 |
| 2018/0061249 A1* | 3/2018 | Cui | G08G 5/0043 |

* cited by examiner

US 10,101,741 B2

UNMANNED AERIAL VEHICLE, CONTROL METHOD, AND RECODING MEDIUM

BACKGROUND

1. Technical Field

The present disclosure relates to an unmanned aerial vehicle capable of flying autonomously, a method of controlling the unmanned aerial vehicle, and a recording medium, and particularly to a technology by which, when Emergency Warning System or the like is received, an unmanned aerial vehicle autonomously selects an appropriate evacuation action and executes the selected action.

2. Description of the Related Art

As a conventional technology that controls devices at the time of a disaster or other emergencies, a method is disclosed in which Emergency Warning System is used. An emergency controller in the conventional technology receives Emergency Warning System transmitted from a broadcast station, analyzes Emergency Warning System, and controls a domestic device in accordance with the analysis result through a home network (see, for example, Japanese Unexamined Patent Application Publication No. 2003-18673).

SUMMARY

In the conventional technology described above, a further improvement has been desired.

In one general aspect, the techniques disclosed here feature an unmanned aerial vehicle. The unmanned aerial vehicle includes: a memory that stores first information acquired and second information acquired, the first information indicating the current position of the unmanned aerial vehicle, the second information indicating the current position of a manipulation device that transmits a command to remotely manipulate the unmanned aerial vehicle; a receiver that receives information transmitted from a transmission source, the information including an emergency warning; a processor; and a controller that controls the unmanned aerial vehicle. The processor compares a target region which is indicated in the formation and for which the emergency warning is intended and the current position of the unmanned aerial vehicle and compares the target region and the current position of the manipulation device. The controller evacuates the unmanned aerial vehicle in accordance with the results of the comparisons.

These general and specific aspects may be implemented using a system, a method, and a computer program, and any combination of systems, methods, and computer programs.

According to the present disclosure, it is possible to implement an unmanned aerial vehicle that can autonomously take an appropriate evacuation action.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
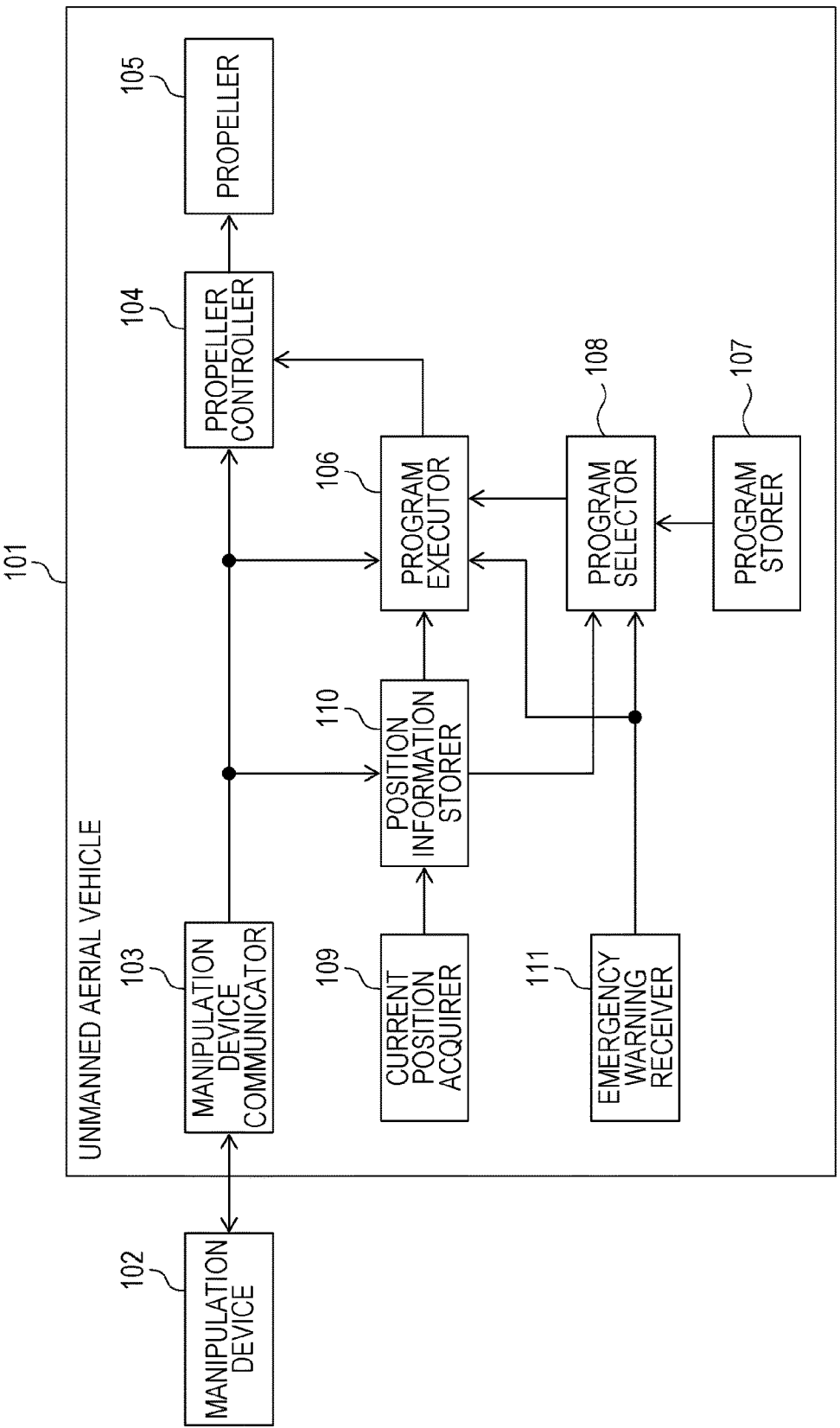
FIG. 1 is a block diagram illustrating an example of the structure of an unmanned aerial vehicle in Embodiment 1 of the present disclosure.

Underlying Knowledge Forming Basis of the Present Disclosure

As unmanned aerial vehicles become less expensive and have move advanced functions, such vehicles are used in aerial photography, investigation, agricultural support, and other various applications in recent years.

If, however, an unmanned aerial vehicle is used at the time of a disaster or other emergencies, various unexpected situations may occur. In particular, even if an unmanned aerial vehicle is not flying in a disaster region, unexpected situations as described below may occur because the unmanned aerial vehicle has a feature of freely moving over a certain range.

If, for example, the manipulator is present in a region in which a disaster occurred and suffers from the disaster, the manipulator may become unable to manipulate the unmanned aerial vehicle. If this happens, the unmanned aerial vehicle may become uncontrollable and may drop. If the manipulator become unable to manipulate the unmanned aerial vehicle as described above, it is necessary to land the unmanned aerial vehicle safely or take another evacuation action.

Even if, for example, the manipulator and unmanned aerial vehicle are outside the disaster region at the time of the disaster, if the manipulator intentionally or unintentionally causes the unmanned aerial vehicle to fly to the disaster region, the unmanned aerial vehicle may impede the action of a fire helicopter or air rescue plane. In a worse scenario, the fire helicopter or air rescue plane may collide with the unmanned aerial vehicle. In such situation, the flight of the unmanned aerial vehicle needs to be restricted so that the unmanned aerial vehicle does not enter the disaster region.

In addition, in the case where, while the unmanned aerial vehicle automatically navigates along a flight route that has been set in advance, a disaster occurs and the flight route includes the disaster region, the unmanned aerial vehicle needs to bypass the disaster region and head for the destination or needs to abandon an arrival at the destination and return to the position of departure, in consideration of the situation of the disaster place.

Therefore, the unmanned aerial vehicle is desired to take an appropriate evacuation action at the time of an emergency in accordance not only with the situation around the current position of the unmanned aerial vehicle itself but also with disaster situations around a plurality of positions including the current position of the manipulation device, the position of departure, pass-through position, and destination on the flight route.

However, the conventional technology described above assumes that devices controlled at the time of an emergency are installed in a single fixed place, and does not disclose an evacuation action to be taken by an unmanned aerial vehicle in consideration of disaster situations around a plurality of positions.

In view of the above, the present inventor studied the following for improvement.

(1) An unmanned aerial vehicle according to an aspect of the present disclosure is an unmanned aerial vehicle. The unmanned aerial vehicle includes: a memory that stores first information acquired and second information acquired, the first information indicating the current position of the unmanned aerial vehicle, the second information indicating the current position of a manipulation device that transmits a command to remotely manipulate the unmanned aerial vehicle; a receiver that receives information transmitted from a transmission source, the information including an emergency warning; a processor; and a controller that controls the unmanned aerial vehicle. The processor compares a target region which is indicated in the information and for which the emergency warning is intended and the current position of the unmanned aerial vehicle and compares the target region and the current position of the manipulation device. The controller evacuates the unmanned aerial vehicle in accordance with the results of the comparisons.

Thus, it is possible to cause the unmanned aerial vehicle to take an evacuation action in consideration of the current position of the unmanned aerial vehicle and the current position of the manipulation device, and accordingly an unmanned aerial vehicle capable of autonomously taking an appropriate evacuation action can be implemented.

(2) In the above aspect: the transmission source may include a broadcast station; the information may include a broadcast wave; and the processor may detect a start signal for the emergency warning and a regional code indicating the target region, the start signal and the regional code being included in the broadcast wave.

Thus, the unmanned aerial vehicle, which moves over a certain range, can select a flexible action suitable for the situation of the emergency. In particular, even if the current position of the unmanned aerial vehicle is not included in the target region for which an emergency warning is intended, it is possible to appropriately evacuate the unmanned aerial vehicle by executing an evacuation action.

(3) In the above aspect: the memory may further store a plurality of programs; the processor may select one program from the plurality of programs in accordance with the results of the comparisons and may execute the selected program; and in response to the selected program being executed, the controller may evacuate the unmanned aerial vehicle.

Since one selected program is executed to cause the unmanned aerial vehicle to take an evacuation action, it is possible to cause the unmanned aerial vehicle to autonomously take an appropriate action at the time of an emergency with a simple structure of switching among programs.

(4) In the above aspect: the unmanned aerial vehicle may further include a communicator that receives the command; if the results of the comparisons indicate that the current position of the unmanned aerial vehicle is not included in the target region and the current position of the manipulation device is not included in the target region, the processor may invalidate the command; and the controller may cause the unmanned aerial vehicle to fly outside the target region.

Thus, if the unmanned aerial vehicle and the manipulation device, in other words, the manipulator, are present outside a target region for which an emergency warning is intended, it is possible to prevent the unmanned aerial vehicle from entering the target region for which an emergency warning is intended due to an intended or unintended manipulation of the manipulation device by the manipulator.

(5) In the above aspect: the unmanned aerial vehicle may further include a communicator that receives the command; if the results of the comparisons indicate that the current position of the unmanned aerial vehicle is not included in the target region and the current position of the manipulation device is included in the target region, the processor may decide whether the command has not been issued for a certain time; and if the processor decides that the command has not been issued for the certain time, the controller may land the unmanned aerial vehicle at the current position of the unmanned aerial vehicle.

Thus, if an emergency warning is issued in a region including the position of the manipulation device, in other words, the manipulator, but a remote command is not issued from the manipulation device to the unmanned aerial vehicle for a certain time, it can be decided that the manipulator has become unable to remotely manipulate the unmanned aerial vehicle because, for example, the manipulator has suffered from a disaster, and the unmanned aerial vehicle can be made to land at its current position. This can avoid the unmanned aerial vehicle from dropping.

(6) In the above aspect: the unmanned aerial vehicle may further include a communicator that receives the command; if the results of the comparisons indicate that at least the current position of the unmanned aerial vehicle is included in the target region, the processor may invalidate the command and may decide whether the distance between the current position of the unmanned aerial vehicle and the current position of the manipulation device is larger than or equal to a predetermined value; if the processor decides that the distance is larger than or equal to the predetermined value, the controller may land the unmanned aerial vehicle at the current position of the unmanned aerial vehicle; and if the processor decides that the distance is smaller than the predetermined value, the controller may land the unmanned aerial vehicle at the current position of the manipulation device.

Thus, if the unmanned aerial vehicle is present in a target region for which an emergency warning is intended, it is possible to invalidate the remote manipulation by the manipulation device. It is also possible to quickly cancel the flight of the unmanned aerial vehicle in the target region by landing the unmanned aerial vehicle at the current position of the unmanned aerial vehicle or returning the unmanned aerial vehicle to the position of the manipulation device.

(7) An unmanned aerial vehicle according to another aspect of the present disclosure is an unmanned aerial vehicle. The unmanned aerial vehicle includes: a memory that stores first information acquired and second information acquired, the first information indicating the current position of the unmanned aerial vehicle, the second information indicating a flight route of the unmanned aerial vehicle, the flight route including a position of departure, a pass-through position, and a destination; a receiver that receives information transmitted from a transmission source, the information including an emergency warning; a processor; and a controller that controls the unmanned aerial vehicle along the flight route. The processor compares a target region which is indicated in the information and for which the emergency warning is intended and the current position of the unmanned aerial vehicle, compares the target region and the position of departure, compares the target region and the pass-through position, compares the target region and the destination, and compares the current position of the unmanned aerial vehicle and the pass-through position. The controller evacuates the unmanned aerial vehicle in accordance with the results of the comparisons.

Thus, it is possible to cause the unmanned aerial vehicle to take an evacuation action in consideration of the current position of the unmanned aerial vehicle, the position of departure, the pass-through position, and the destination, and accordingly an unmanned aerial vehicle capable of autonomously taking an appropriate evacuation action at the time of a disaster can be implemented.

(8) In the above aspect: the transmission source may include a broadcast station; the information may include a broadcast wave; and the processor may detect a start signal for the emergency warning and a regional code indicating the target region, the start signal and the regional code being included in the broadcast wave.

Thus, the unmanned aerial vehicle, which moves over a certain range, can select a flexible action suitable for the situation of the emergency. In particular, even if the current position of the unmanned aerial vehicle is not included in the target region for which an emergency warning is intended, it is possible to appropriately evacuate the unmanned aerial vehicle by executing an evacuation action.

(9) In the above aspect: the memory may further store a plurality of programs; the processor may select one program from the plurality of programs in accordance with the results of the comparisons and may execute the selected program; and in response to the selected program being executed, the controller may evacuate the unmanned aerial vehicle.

Since one selected program is executed to cause the unmanned aerial vehicle to take an evacuation action, it is possible to cause the unmanned aerial vehicle to autonomously take an appropriate action at the time of an emergency with a simple structure of switching among programs.

(10) In the above aspect: if the results of the comparisons indicate that the pass-through position is included in the target region, the unmanned aerial vehicle has not passed through the pass-through position, the current position of the unmanned aerial vehicle is not included in the target region, and the destination is not included in the target region, the processor may create a new flight route along which the unmanned aerial vehicle arrives at the destination from the current position of the unmanned aerial vehicle without passing through the target region; and the controller may cause the unmanned aerial vehicle to fly along the new flight route.

Thus, if only a pass-through position through which the unmanned aerial vehicle has not passed is included in a target region for which an emergency warning is intended, it is possible to review the flight route so that the unmanned aerial vehicle does not pass through the target region for which an emergency warning is intended. Therefore, it is also possible to appropriately evacuate the unmanned aerial vehicle and can lead the unmanned aerial vehicle to the destination.

(11) In the above aspect: if the results of the comparisons indicate that at least the destination is included in the target region and the position of departure is not included in the target region, the processor may create a new flight route along which the unmanned aerial vehicle arrives at the position of departure from the current position of the unmanned aerial vehicle; and the controller may cause the unmanned aerial vehicle to fly along the new flight route.

Thus, if only the destination is included in a target region for which an emergency warning is intended, it is possible to create a new flight route so that the unmanned aerial vehicle abandons an arrival at the destination and returns to the position of departure, enabling the unmanned aerial vehicle to appropriately evacuate.

(12) In the above aspect, if the results of the comparisons indicate that at least the position of departure and the destination are included in the target region, the controller may land the unmanned aerial vehicle at the current position of the unmanned aerial vehicle.

Thus, it is possible to cause the unmanned aerial vehicle to abandon a return to the position of departure and an arrival at the destination, land the unmanned aerial vehicle at its current position, and appropriately stop the unmanned aerial vehicle.

The present disclosure can be implemented not only as an unmanned aerial vehicle that has a characteristic structure as described above but also as, for example, a method of controlling an unmanned aerial vehicle that executes characteristic processing corresponding to the characteristic structure of an unmanned aerial vehicle. Characteristic processing included in a method of controlling such aerial vehicle can be implemented as a computer program that causes a computer including a processor and a memory to execute the processing. In another aspect below as well, therefore, the same effects as with the unmanned aerial vehicle described above can be obtained.

It will be appreciated that a computer program as described above can be distributed as a computer-readable non-transitory recording medium such as a compact disc-read-only memory (CD-ROM) or through a communication network such as the Internet.

Embodiments of the present disclosure will be described below with reference to the drawings. Embodiments described below are only specific examples of the present disclosure. Shapes, constituent elements, steps, the sequence of these steps, and the like are only examples, and are not intended to restrict the present disclosure. Of the constituent elements in the embodiments below, constituent elements not described in independent claims which indicate the topmost concept of the present disclosure will be described as optional constituent elements. Contents in all embodiments may be combined. Also included in the present disclosure are various variations that are obtained by modifying embodiments of the present disclosure in various ways within a range in which persons having ordinary skill in the art can devise modifications, without departing from the intended scope of the present disclosure.

Embodiment 1

FIG. 1 is a block diagram illustrating an example of the structure of an unmanned aerial vehicle 101 in Embodiment 1 of the present disclosure. In FIG. 1, the unmanned aerial vehicle 101 is remotely manipulated by using a manipulation device 102. The manipulation device 102 has a function that acquires the current position of the manipulation device 102 through Global Positioning System (GPS). The manipulation device 102 transmits a command to manipulate the unmanned aerial vehicle 101 and manipulation device current position information, which indicates the current position of the manipulation device 102, to the unmanned aerial vehicle 101. The unmanned aerial vehicle 101 is an autonomously flying unmanned aerial vehicle and is capable of flying autonomously without receiving a remote command from the manipulation device 102.

The unmanned aerial vehicle 101 has a manipulation device communicator 103, a propeller controller 104, a propeller 105, a program executor 106, a program storer 107, a program selector 108, a current position acquirer 109, a position information storer 110, and an emergency warning receiver 111.

The manipulation device communicator 103, which is coupled to the manipulation device 102 by wireless, receives a manipulation command and manipulation device current position information from the manipulation device 102. The manipulation device communicator 103 inputs the manipulation command received from the manipulation device 102 into the propeller controller 104.

The propeller controller 104 changes the rotational speed of the propeller 105 and the like in response to the received manipulation command to implement a flight such as ascending, descending, moving, and the like according to the command.

The program storer 107, which is composed of a memory and like, stores a plurality of flight control programs (such as a plurality of flight control programs to take evacuation actions) used to control the navigation of the unmanned aerial vehicle 101. The program selector 108, which is composed of a processor and the like, selects a program to be executed from the plurality of flight control programs stored in the program storer 107, and outputs the selected flight control program to the program executor 106.

The program executor 106, which is composed of a processor and like, executes the flight control program selected by the program selector 108. The program executor 106, which is coupled to the propeller controller 104, inputs a manipulation command according to the result of the execution of the flight control program into the propeller controller 104 to control the autonomous flight of the unmanned aerial vehicle 101.

The program executor 106, which is coupled to the manipulation device communicator 103, can monitor a manipulation command from the propeller controller 104. The program executor 106 monitors a manipulation command from the propeller controller 104 to prevent a particular manipulation command input from the manipulation device communicator 103 from being accepted, practicing restrictions on function of the propeller controller 104.

The current position acquirer 109 acquires the current position of the unmanned aerial vehicle 101 through GPS, and outputs aerial vehicle current position information, which indicates the current position of the unmanned aerial vehicle 101, to the position information storer 110.

The position information storer 110, which is composed of a memory and like, stores the unmanned aerial vehicle current position information indicating the current position of the unmanned aerial vehicle 101, that has been input from the current position acquirer 109. The position information storer 110, which is also coupled to the manipulation device communicator 103, also stores manipulation device current position information which is input from the manipulation device 102 and indicates its current position. The position information about the unmanned aerial vehicle 101 and manipulation device 102 is updated at appropriate times.

The emergency warning receiver 111 receives a broadcast wave transmitted from a broadcast station and analyzes the received broadcast wave to detect a start signal for Emergency Warning System and a regional code indicating a target region for which Emergency Warning System is intended. Emergency Warning System is a broadcast performed by using an emergency warning signal stipulated in Article 2, paragraph 1, item 84, subitem 2 in Rule for Enforcement of Radio Law of Japan, the ministerial ordinance of the Ministry of Internal Affairs and Communications, to automatically switch on a television set and a radio receiver that are placed on standby. If a large disaster such as an earthquake occurs or a Tsunami warning is announced, Emergency Warning System is issued to prevent or alleviate damage caused by a disaster.

The emergency warning receiver 111 outputs the start signal for Emergency Warning System and the regional code to the program selector 108 and program executor 106 as emergency warning information that includes target region information indicating a target region for which an emergency warning is intended. A known technology can be used to implement a way to acquire the start signal for Emergency Warning System and a regional code from a broadcast wave, and therefore the descriptions thereof will be omitted.

The broadcast wave to be used may be an analog broadcast wave or a digital broadcast wave. If an analog broadcast wave is used, either of a television broadcast or a radio broadcast may be received.

The frequency of a broadcast wave differs for each region, and therefore the reception frequency needs to be changed in accordance with the current position of the unmanned aerial vehicle 101. When the reception frequency is to be changed, a reception frequency to be used may be determined by broadcast scanning used in a television receiver. Alternatively, a reception frequency to be used may be determined by interconnecting the position information storer 110 and emergency warning receiver 111 and using the current position of the unmanned aerial vehicle 101.

Emergency warning information including target region information that indicates a target region for which an emergency warning is intended is not limited to the above example. Another type of emergency warning information may be used. For example, Earthquake Early Warning announced by the Japan Meteorological Agency as disaster information may be utilized by using a television broadcast, a radio broadcast, cable television (CATV), a mobile telephone network, or the like. In a country other than Japan, emergency warning information used in the country may be used. For example, the Emergency Alert System (EAS) operated in the United States for mobile telephones or the like may be used.

The program selector 108 is coupled to the position information storer 110 and emergency warning receiver 111. Upon receipt of the start signal for Emergency Warning System and the regional code from the emergency warning receiver 111, the program selector 108 selects a flight control program used to take an evacuation action from the program storer 107.

Specifically, when selecting a flight control program used to take an evacuation action, the program selector 108 compares each piece of position information stored in the position information storer 110 and the regional code received from the emergency warning receiver 111, and decides whether the position information is included in the target region, for which an emergency warning is intended, indicated by the regional code. The program selector 108 selects a flight control program used to take an evacuation action in accordance with the decision results, and outputs the selected flight control program to the program executor 106.

The program executor 106 is coupled to the position information storer 110 and emergency warning receiver 111. When executing a flight control program used to take an evacuation action, the program executor 106 can reference and use position information stored in the position information storer 110 and the regional code detected by the emergency warning receiver 111.

In this embodiment, the program selector 108 selects a flight control program used to take an evacuation action from a plurality of flight control programs stored in the program storer 107, based on position information stored in the position information storer 110, the regional code detected by the emergency warning receiver 111, and the like, and the selected flight control program used to take an evacuation action is executed by the program executor 106. However, this embodiment is not limited to this example and various modifications are possible.

For example, a plurality of flight control circuits used to take evacuation actions may be provided, and one flight control circuit used to take an evacuation action may be selected in accordance with position information, a regional code, and the like, and an evacuation action may be taken by using the selected flight control circuit. Alternatively, for example, without storing flight control programs used to take an evacuation action in advance, one flight control program, used to take evacuation actions, that has been selected in accordance with position information, a regional code, and the like may be transmitted to the unmanned aerial vehicle 101, and the transmitted flight control program used to take an evacuation action may be executed by the program executor 106.

Figure 2:
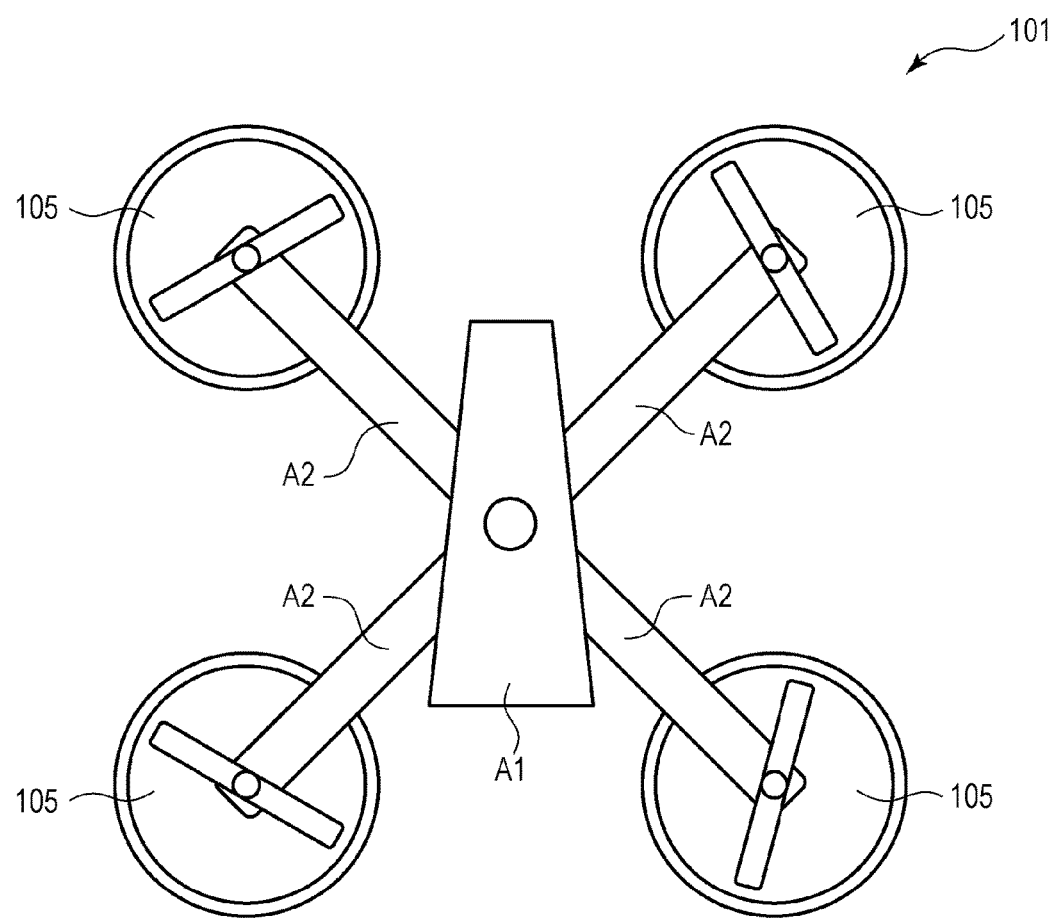
FIG. 2 illustrates an example of the appearance of the unmanned aerial vehicle illustrated in FIG. 1.

FIG. 2 illustrates an example of the appearance of the unmanned aerial vehicle 101 illustrated in FIG. 1. As illustrated in FIG. 2, the unmanned aerial vehicle 101 has a main body A1, four supports A2, and four propellers 105, which generate an impelling force for the unmanned aerial vehicle 101. Each propeller 105 is attached to the end of one of the supports A2, which extend from the main body A1 in four directions. The manipulation device communicator 103, propeller controller 104, program executor 106, program storer 107, program selector 108, current position acquirer 109, position information storer 110, and emergency warning receiver 111 illustrated in FIG. 1 are placed in the main body A1.

Figure 3:
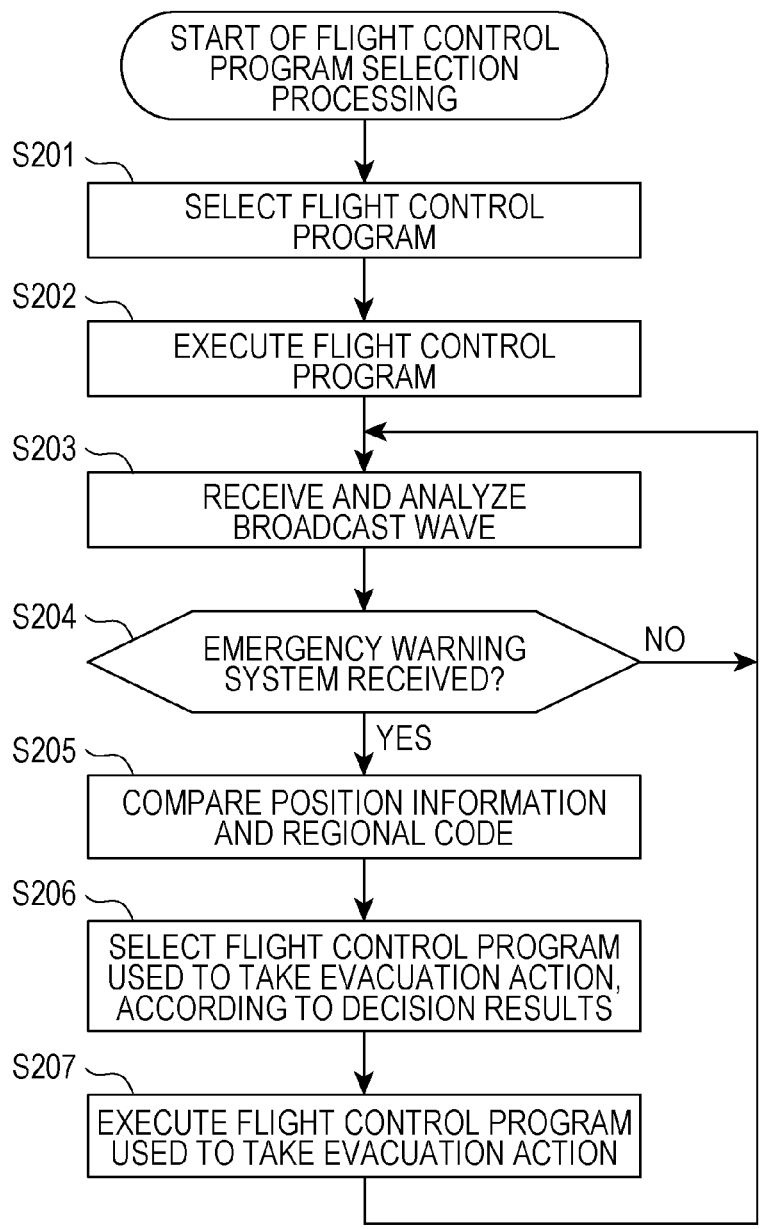
FIG. 3 is a flowchart illustrating an example of flight control program selection processing by the unmanned aerial vehicle illustrated in FIG. 1.

FIG. 3 is a flowchart illustrating an example of flight control program selection processing by the unmanned aerial vehicle 101 illustrated in FIG. 1. This processing is started immediately after the power of the unmanned aerial vehicle 101 is turned on.

First, the program selector 108 selects a flight control program that is executed in normal times from the program storer 107 (step S201).

Then, the program executor 106 executes the selected flight control program (step S202).

If there is no flight control program to be executed in normal times, processing in steps S201 and S202 may be skipped.

Next, the emergency warning receiver 111 receives a broadcast wave transmitted from a broadcast station and analyzes the received wave to detect the start signal for Emergency Warning System and a regional code (step S203). The emergency warning receiver 111 then decides whether Emergency Warning System has been received (step S204). If Emergency Warning System has not been received (No in step S204), the emergency warning receiver 111 returns to step S203 and continues processing. That is, processing in step S203 and S204 is repeatedly executed until the start signal for Emergency Warning System is detected.

If Emergency Warning System has been received (Yes in step S204), that is, the start signal for Emergency Warning System has been detected, the program selector 108 acquires a regional code from the emergency warning receiver 111 and also acquires the current position information of the unmanned aerial vehicle 101 and the current position information of the manipulation device 102 from the position information storer 110, and compares the acquired regional code and each piece of current position information to decide whether each piece of current position information is included in the target region for which an emergency warning is intended (step S205).

After that, the program selector 108 selects a flight control program used to take an evacuation action from the program storer 107 in accordance with the decision results, as described later (step S206).

The program executor 106 executes the selected flight control program used to take an evacuation action (step S207) and returns to step S203 and repeats processing in step S203 and later to prepare for next Emergency Warning System.

Next, specific examples of the flight control program used to take an evacuation action that is selected in step S206 and executed in step S207 will be described below in detail.

Example 1 of a Flight Control Program Used to Take an Evacuation Action

Figure 4:
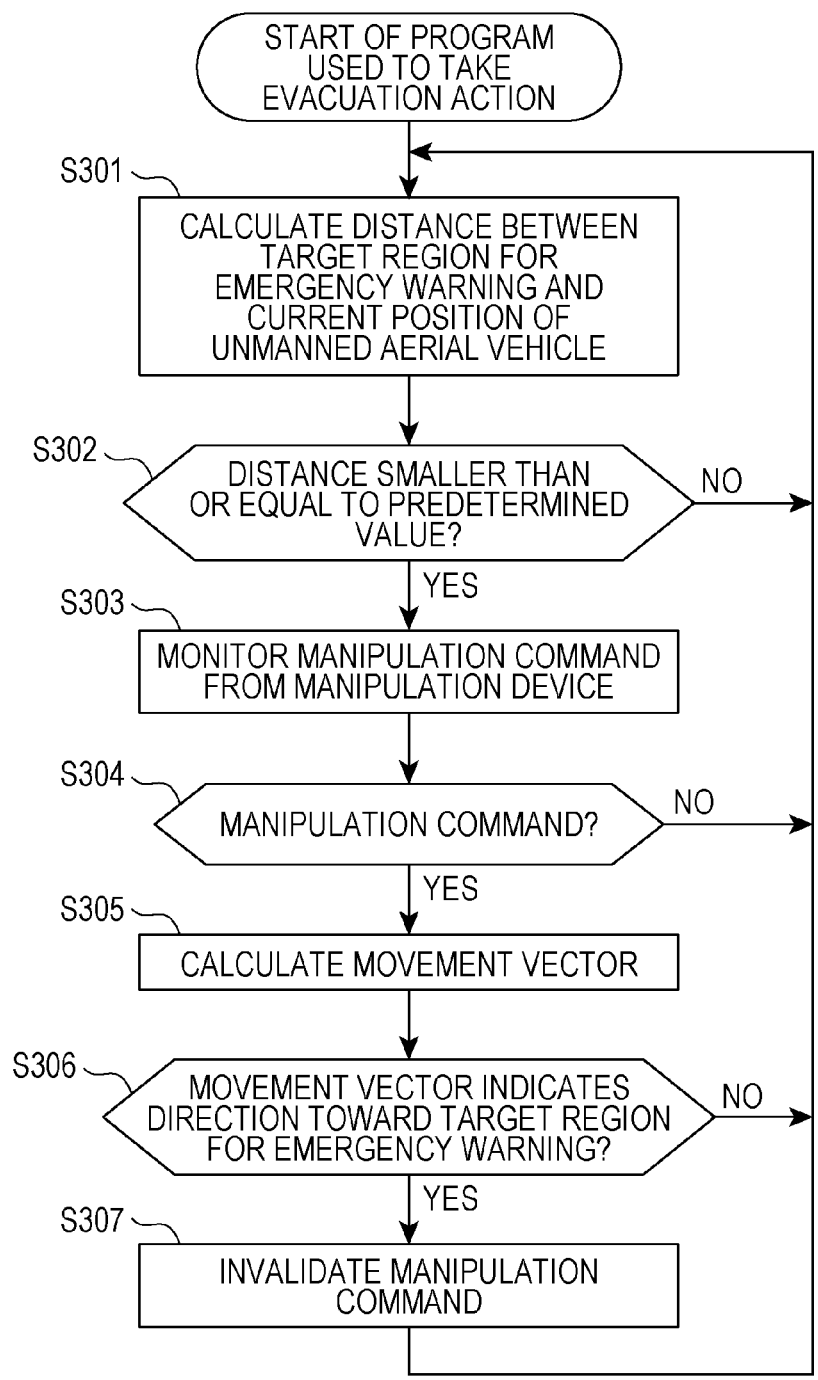
FIG. 4 is a flowchart illustrating an example of processing by a first flight control program used to take an evacuation action in the unmanned aerial vehicle illustrated in FIG. 1.

FIG. 4 is a flowchart illustrating an example of processing by a first flight control program used to take an evacuation action in the unmanned aerial vehicle 101 illustrated in FIG. 1. This processing is performed by a flight control program used to take an evacuation action, that is selected by the program selector 108 when none of the current positions of the unmanned aerial vehicle 101 and manipulation device 102 are included in a target region for which an emergency warning is intended. Processing described below is executed by the program executor 106.

First, in the first flight control program used to take an evacuation action, the program executor 106 acquires position information from the position information storer 110 and also acquires a regional code from the emergency warning receiver 111, and the program executor 106 calculates a distance between the current position of the unmanned aerial vehicle 101 and the boundary of the target region for which an emergency warning is intended, from the position information of the unmanned aerial vehicle 101 and the regional code (step S301).

The program executor 106 then decides whether the distance between the current position of the unmanned aerial vehicle 101 and the boundary of the target region for which an emergency warning is intended is smaller than or equal to a predetermined value (step S302). If the distance is larger than the predetermined value (No in step S302), the program executor 106 returns to step S301 and continues processing. If the distance is smaller than or equal to the predetermined value (Yes in step S302), the program executor 106 monitors a manipulation command from the manipulation device 102 (step S303).

The program executor 106 then decides whether there is a manipulation command from the manipulation device 102 (step S304). If no manipulation command has been input from the manipulation device 102 (No in step S304), the program executor 106 returns to step S301 and continues processing. If a manipulation command has been input from the manipulation device 102 (Yes in step S304), the program executor 106 calculates a movement vector indicating a direction in which the unmanned aerial vehicle 101 moves in response to the manipulation command and a distance between the current position of the unmanned aerial vehicle 101 and the boundary of the target region for which an emergency warning is intended (step S305).

The program executor 106 then decides whether the movement vector indicates a direction toward the target region for which an emergency warning is intended (step S306). If the movement vector does not indicate a direction toward the target region for which an emergency warning is intended (No in step S306), the program executor 106 returns to step S301 and continues processing. If the movement vector indicates a direction toward the target region for which an emergency warning is intended (Yes in step S306), the program executor 106 invalidates the manipulation command from the manipulation device 102 (step S307), after which the program executor 106 returns to step S301 and repeats processing in step S301 and later.

Figure 5:
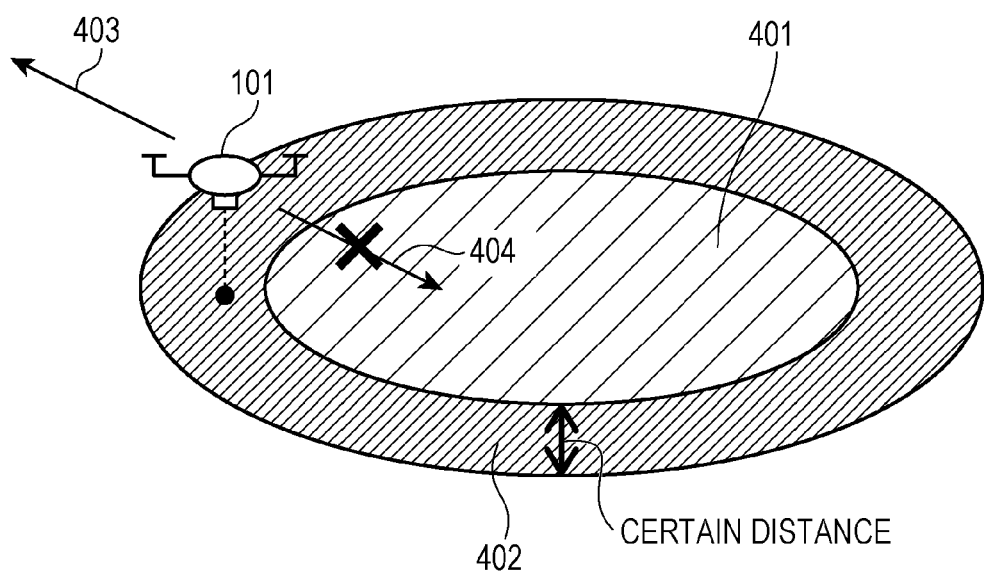
FIG. 5 is a conceptual diagram illustrating an example of the operation of the unmanned aerial vehicle, the operation being implemented by processing, illustrated in FIG. 4, by the first flight control program used to take an evacuation action.

FIG. 5 is a conceptual diagram illustrating an example of the operation of the unmanned aerial vehicle 101, the operation being implemented by processing, illustrated in FIG. 4, by the first flight control program used to take an evacuation action. The hatched circular area illustrated in FIG. 5 represents a target area 401 for which an emergency warning is intended. The hatched annular area outside the target area 401 for which an emergency warning is intended represents a monitored area 402 at a certain distance (predetermined value) from the target area 401 for which an emergency warning is intended.

In FIG. 5, the unmanned aerial vehicle 101 is positioned above the monitored area 402 and indicates movement vectors 403 and 404 as examples of the movement vector of the unmanned aerial vehicle 101. The movement vector 403 indicates a direction in which the unmanned aerial vehicle 101 moves away from the target area 401 for which an emergency warning is intended, and thus the case applies in which the movement vector 403 does not indicate a direction toward the target area 401 for which an emergency warning is intended. Therefore, the program executor 106 maintains the manipulation command, from the manipulation device 102, to move the unmanned aerial vehicle 101 toward the movement vector 403, according to the first flight control program used to take an evacuation action.

By contrast, the movement vector 404 indicates a direction in which the unmanned aerial vehicle 101 moves toward the target area 401 for which an emergency warning is intended, and thus the case applies in which the movement vector 404 indicates a direction toward the target area 401 for which an emergency warning is intended. Therefore, the program executor 106 invalidates the manipulation command, from the manipulation device 102, to move the unmanned aerial vehicle 101 toward the movement vector 404, based on the first flight control program used to take an evacuation action, to prevent the unmanned aerial vehicle 101 from entering the target area 401 for which an emergency warning is intended.

As described above, by using the first flight control program used to take an evacuation action, if the unmanned aerial vehicle 101 and manipulation device 102 are present outside a target region for which an emergency warning is intended, it is possible to prevent the unmanned aerial vehicle 101 from entering the target region for which an emergency warning is intended, due to the intended or unintended manipulation of the manipulation device 102 by the manipulator. Accordingly, this can prevent the navigation of the unmanned aerial vehicle 101 from impeding the action of a fire helicopter or air rescue plane, and can also prevent a collision between the unmanned aerial vehicle 101 and a fire helicopter or air rescue plane.

The method of restricting the unmanned aerial vehicle 101 from entering a target region for which an emergency warning is intended is not limited to processing illustrated in FIG. 4. For example, a method employed in a currently available unmanned aerial vehicle to restrict it from entering a non-fly zone may be used.

Although, in this example, the movement vector, which indicates both a direction in which the unmanned aerial vehicle 101 moves in response to a manipulation command from the manipulation device 102 and a distance between the current position of the unmanned aerial vehicle 101 and the boundary of the target region for which an emergency warning is intended, is calculated in a two-dimensional plane, the calculation of the movement vector is not limited to this example. The movement vector may be calculated in a three-dimensional space in consideration of the height of the unmanned aerial vehicle 101.

Example 2 of a Flight Control Program Used to Take an Evacuation Action

Figure 6:
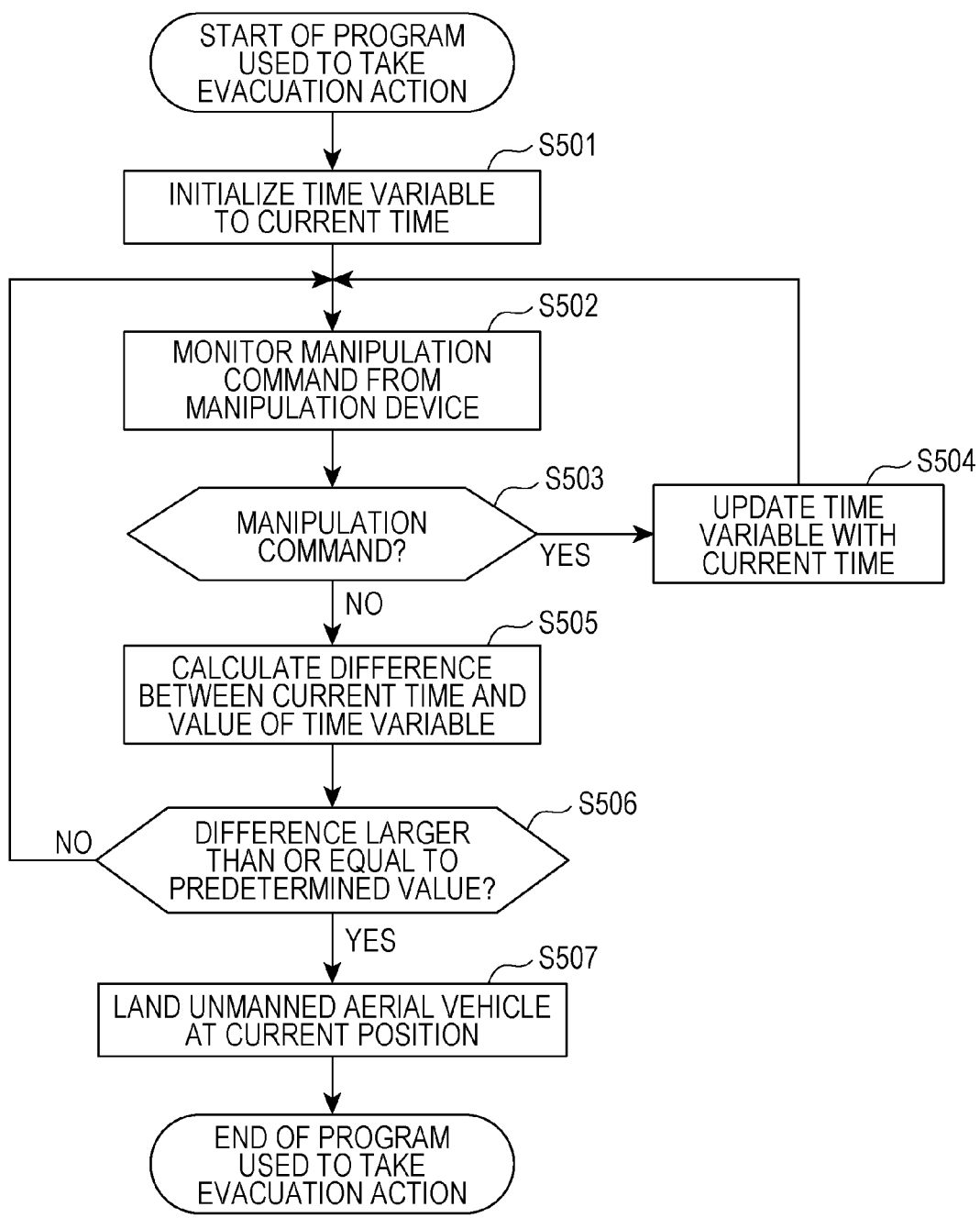
FIG. 6 is a flowchart illustrating an example of processing by a second flight control program used to take an evacuation action in the unmanned aerial vehicle illustrated in FIG. 1.

FIG. 6 is a flowchart illustrating an example of processing by a second flight control program used to take an evacuation action in the unmanned aerial vehicle 101 illustrated in FIG. 1. This processing is performed by a flight control program used to take an evacuation action, that is selected by the program selector 108 when the current position of the unmanned aerial vehicle 101 is not included in a target region for which an emergency warning is intended and the current position of the manipulation device 102 is included in the target region for which an emergency warning is intended. Processing described below is executed by the program executor 106.

First, in the second flight control program used to take an evacuation action, the program executor 106 initializes a time variable that stores time to the current time (step S501).

The program executor 106 then monitors a manipulation command from the manipulation device 102 (step S502).

The program executor 106 then decides whether there is a manipulation command from the manipulation device 102 (step S503). If a manipulation command has been input from the manipulation device 102 (Yes in step S503), the program executor 106 updates the time variable with the current time (step S504), after which the program executor 106 returns to step S502 and continues processing.

If no manipulation command has been input from the manipulation device 102 (No in step S503), the program executor 106 calculates a difference between the current time and the value of the time variable (step S505).

Next, the program executor 106 decides whether the difference in time is larger than or equal to a predetermined value (step S506). If the difference in time is smaller than the predetermined value (No in step S506), the program executor 106 returns to step S502 and continues processing. If the difference in time is larger than or equal to a predetermined value (Yes in step S506), the program executor 106 inputs a command into the propeller controller 104 to land the unmanned aerial vehicle 101 at the current position of the unmanned aerial vehicle 101 (step S507).

As described above, by using the second flight control program used to take an evacuation action, when an emergency warning is issued in a region including the position of the manipulation device 102, that is, the position of the manipulator, if a remote command is not issued from the manipulation device 102 to the unmanned aerial vehicle 101 for a certain time, it is decided that the manipulator has become unable to remotely manipulate the unmanned aerial vehicle 101 because, for example, the manipulator has suffered from a disaster, and the unmanned aerial vehicle 101 is made to land at the current position of the unmanned aerial vehicle 101. This can avoid the unmanned aerial vehicle 101 from dropping.

Example 3 of a Flight Control Program Used to Take an Evacuation Action

Figure 7:
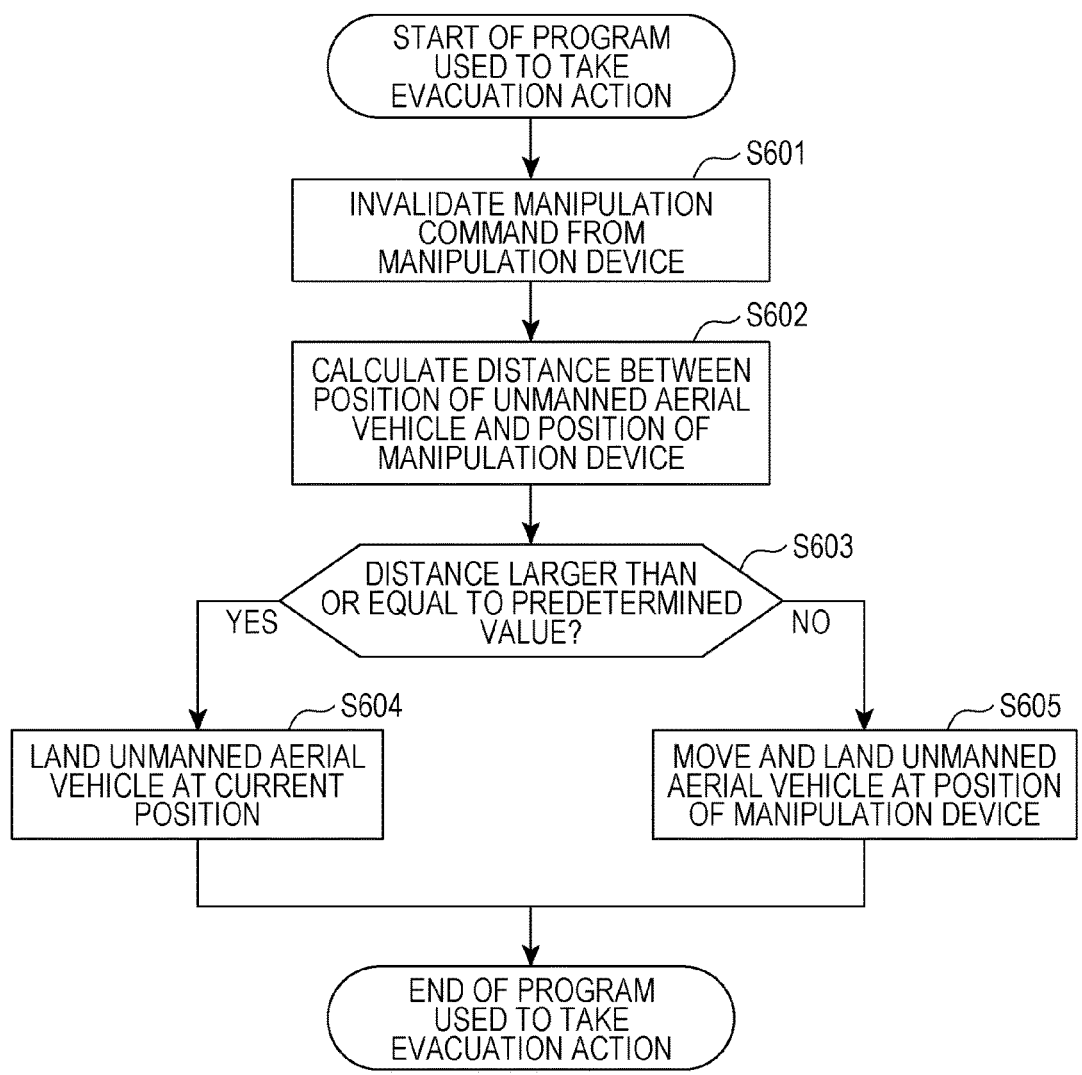
FIG. 7 is a flowchart illustrating an example of processing by a third flight control program used to take an evacuation action in the unmanned aerial vehicle illustrated in FIG. 1.

FIG. 7 is a flowchart illustrating an example of processing by a third flight control program used to take an evacuation action in the unmanned aerial vehicle 101 illustrated in FIG. 1. This processing is performed by a flight control program used to take an evacuation action, that is selected by the program selector 108 when the current position of the unmanned aerial vehicle 101 is included in a target region for which an emergency warning is intended. Processing described below is executed by the program executor 106.

First, in the third flight control program used to take an evacuation action, the program executor 106 imposes manipulation restrictions on the propeller controller 104 to prevent any manipulation command from being accepted from the manipulation device communicator 103 (step S601).

The program executor 106 then references the position information storer 110, acquires the current position information of the unmanned aerial vehicle 101 and the current position information of the manipulation device 102, and calculates a distance between the position of the unmanned aerial vehicle 101 and the position of the manipulation device 102 (step S602).

The program executor 106 then decides whether the distance is larger than or equal to a predetermined value (step S603). If the distance is larger than or equal to the predetermined value (Yes in step S603), the program executor 106 inputs a command into the propeller controller 104 to land the unmanned aerial vehicle 101 at the current position of the unmanned aerial vehicle 101 (step S604).

If the distance is smaller than the predetermined value (No in step S603), the program executor 106 inputs a command to the propeller controller 104 so that the unmanned aerial vehicle 101 is moved to and landed at the current position of the manipulation device 102 (step S605).

As described above, by using the third flight control program used to take an evacuation action, if the unmanned aerial vehicle 101 is positioned in a target region for which an emergency warning is intended, the unmanned aerial vehicle 101 is controlled so that a remote manipulation by the manipulation device 102 is invalidated, after which the unmanned aerial vehicle 101 is landed at the current position of the unmanned aerial vehicle 101 or is returned to the position of the manipulation device 102. Therefore, the flight in the target region for which an emergency warning is intended can be cancelled immediately.

Effects

With the processing described above, the unmanned aerial vehicle 101 can autonomously take an evaluation action by using Emergency Warning System. In this case, a regional code included in Emergency Warning System, that is, a target region for which an emergency warning is intended, and the current position of the unmanned aerial vehicle 101 are compared, and the target region and the current position of the manipulation device 102 are compared, and thereafter whether the current positions are included in the target region is decided. An appropriate flight control program used to take an evacuation action can be selected in accordance with the decision results. Therefore, the unmanned aerial vehicle 101 can take an appropriate action suitable to the emergency situation. In particular, even when the current position of the unmanned aerial vehicle 101 is not included in the target region for which an emergency warning is intended, if an evacuation action is taken, it is possible to appropriately evacuate the unmanned aerial vehicle 101.

The three flight control programs to take evacuation actions, described above, are examples. Flight control programs to take evacuation actions in this embodiment are not limited to these programs. For example, a flight control program used to take an evacuation action obtained by combining processing in FIG. 4 and processing in FIG. 6 together may be used to restrict the unmanned aerial vehicle 101 from entering a target region for which an emergency warning is intended and to land the unmanned aerial vehicle 101 if a manipulation has not been performed for a certain time.

Embodiment 2

Figure 8:
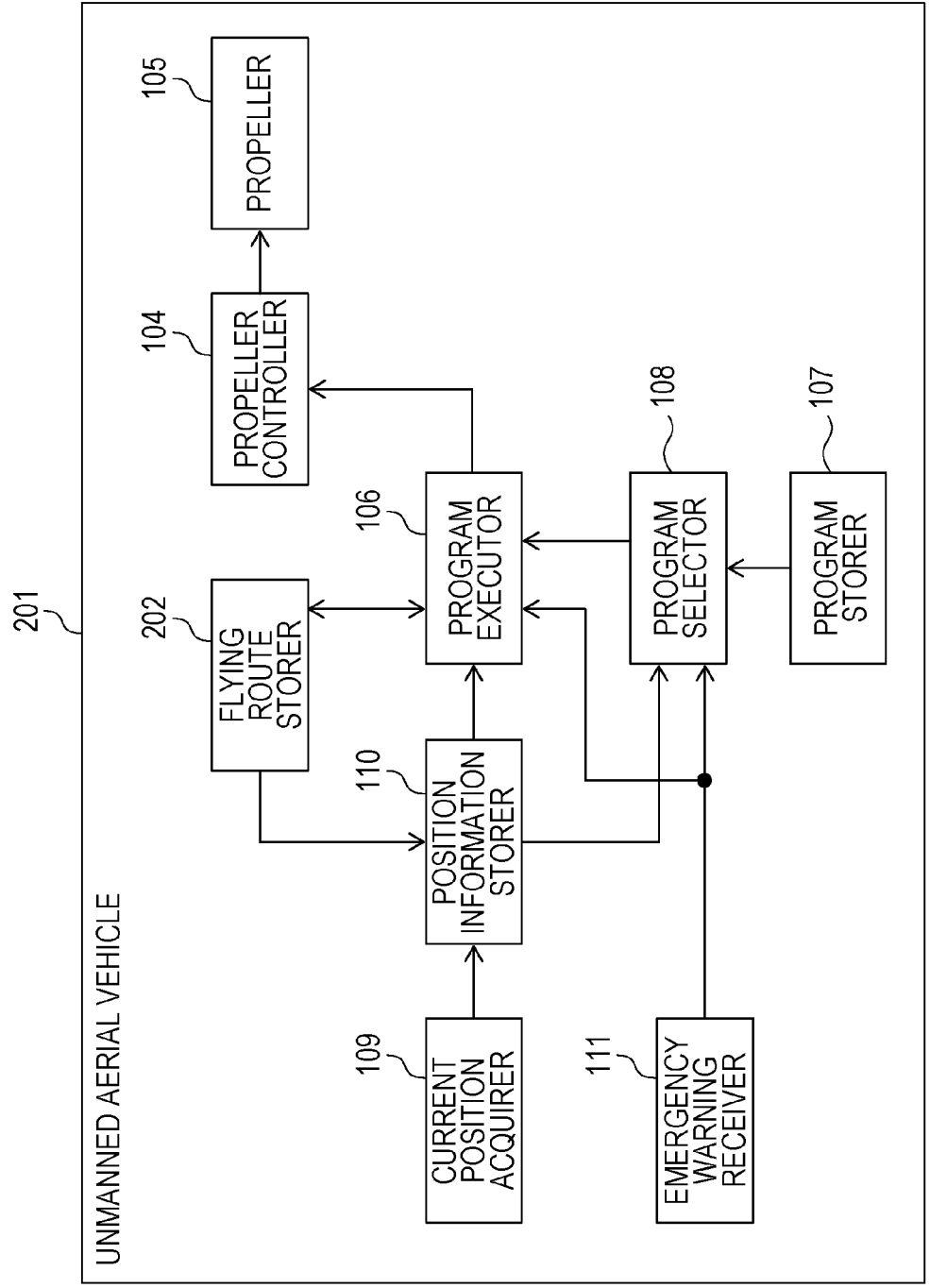
FIG. 8 is a block diagram illustrating an example of the structure of an unmanned aerial vehicle in Embodiment 2 of the present disclosure.

FIG. 8 is a block diagram illustrating an example of the structure of an unmanned aerial vehicle 201 in Embodiment 2 of the present disclosure. In FIG. 8, the same constituent elements as in FIG. 1 are denoted by the same reference numerals and part of descriptions will be omitted. In this embodiment, the unmanned aerial vehicle 201 automatically navigates along a flight route that has been set in advance. The unmanned aerial vehicle 201 has a flight route storer 202, the propeller controller 104, the propeller 105, the program executor 106, the program storer 107, the program selector 108, the current position acquirer 109, the position information storer 110, and the emergency warning receiver 111.

The flight route storer 202 stores a flight route that has been set in advance together with place-of-departure information indicating a position of departure, pass-through position information indicating a pass-through position, and destination information indicating a destination, the position of departure, pass-through position, and destination being on the flight route.

The program executor 106 references the flight route stored in the flight route storer 202 and outputs a command to the propeller controller 104 so that the unmanned aerial vehicle 201 automatically navigates.

The program executor 106 can create a new flight route and can update the information stored in the flight route storer 202 with the new flight route.

The position information storer 110 not only stores aerial vehicle current position information indicating the current position of the unmanned aerial vehicle 201, but also reads, from the flight route storer 202, place-of-departure information indicating a position of departure, pass-through position information indicating a pass-through position, and destination information indicating a destination, the position of departure, pass-through position, and destination being on the flight route, and stores the read information. The program executor 106 references the flight route storer 202 and acquires the place-of-departure information, pass-through position information, and destination information.

The flow of processing to select a flight control program in Embodiment 2 is the same as in FIG. 3, and thus the description thereof will be omitted. However, the flight control program selected in step S201 and executed in step S202 is an autonomous navigation program that causes the unmanned aerial vehicle 201 to navigate along the flight route stored in the flight route storer 202.

In step S205, the program selector 108 acquires a regional code from the emergency warning receiver 111 and acquires, from the position information storer 110, aerial vehicle current position information indicating the current position of the unmanned aerial vehicle 201, place-of-departure information indicating a position of departure, pass-through position information indicating a pass-through position, and destination information indicating a destination, the position of departure, pass-through position, and destination being on the flight route. The program selector 108 compares the acquired regional code and each piece of acquired position information and decides whether the each piece of acquired position information is included in the target region for which an emergency warning is intended that is indicated by the regional code.

In step S206, the program selector 108 selects a flight control program used to take an evacuation action from the program storer 107 in accordance with decision results, which will be described later. In step S207, the program executor 106 executes the selected flight control program used to take an evacuation action.

Next, a specific example of the flight control program used to take an evacuation action selected in step S206 and executed in step S207 will be described in detail.

Example 4 of a Flight Control Program Used to Take an Evacuation Action

Figure 9:
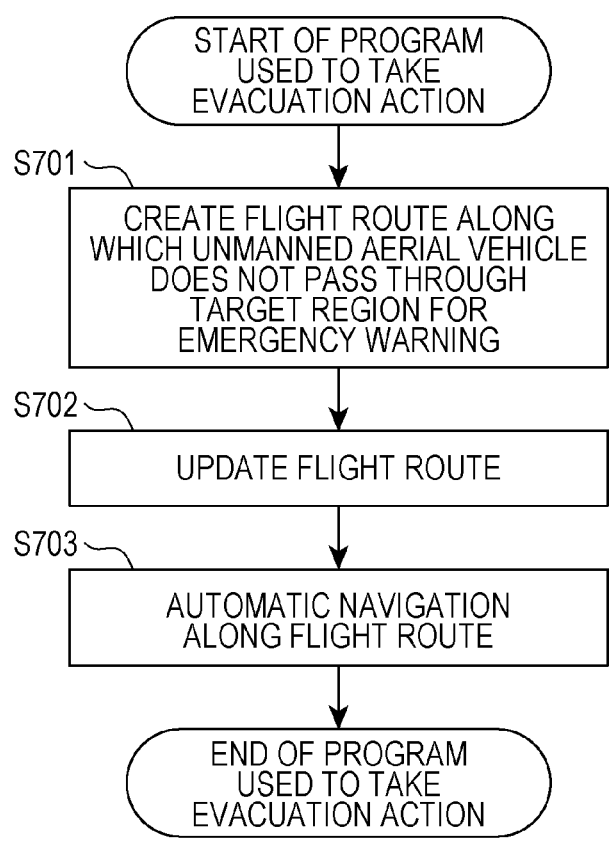
FIG. 9 is a flowchart illustrating an example of processing by a fourth flight control program used to take an evacuation action in the unmanned aerial vehicle illustrated in FIG. 8.

FIG. 9 is a flowchart illustrating an example of processing by a fourth flight control program used to take an evacuation action in the unmanned aerial vehicle 201 illustrated in FIG. 8. This processing is performed by a flight control program used to take an evacuation action, that is selected by the program selector 108 when the current position of the unmanned aerial vehicle 201 is not included in a target region for which an emergency warning is intended, a pass-through position yet to be passed on the flight route is included in the target region for which an emergency warning is intended, and the destination on the flight route is not included in the target region for which the emergency warning is intended. Processing described below is executed by the program executor 106.

First, in the fourth flight control program used to take an evacuation action, the program executor 106 acquires position information from the position information storer 110 and acquires a regional code from the emergency warning receiver 111, after which the program executor 106 creates a new flight route along which the unmanned aerial vehicle 201 can arrive at the destination of the flight route from the current position of the unmanned aerial vehicle 201 without passing through the target region for which an emergency warning is intended (step S701).

Next, the program executor 106 stores the new flight route in the flight route storer 202, and updates the flight route (step S702).

The program executor 106 then inputs a command to the propeller controller 104 so that the unmanned aerial vehicle 201 navigates along the updated flight route (step S703).

Figure 10:
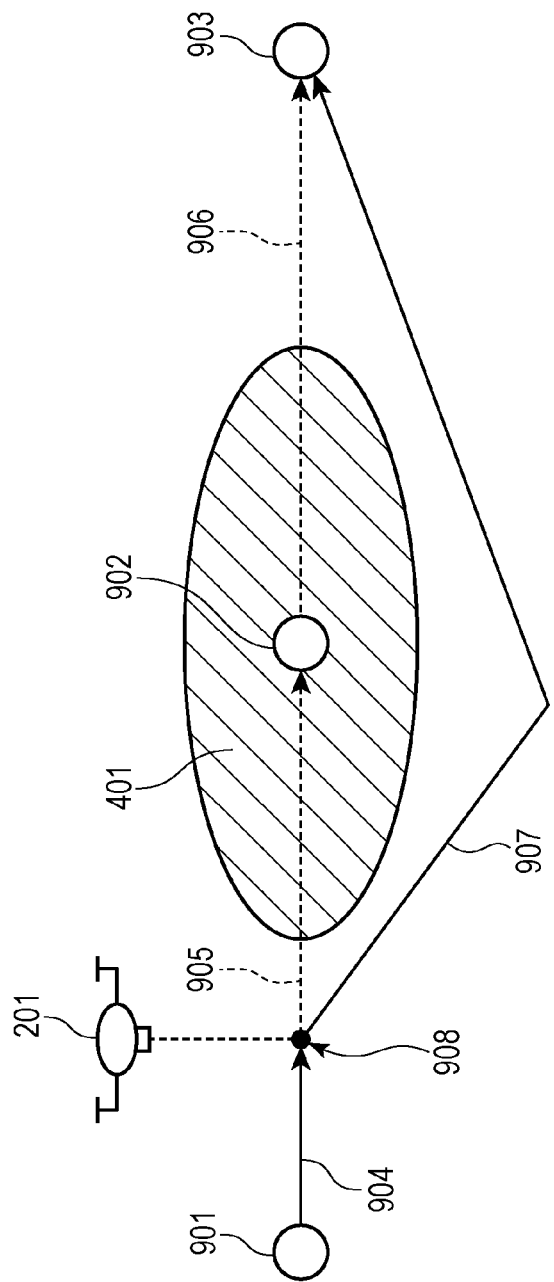
FIG. 10 is a conceptual diagram illustrating an example of the operation of the unmanned aerial vehicle, the operation being implemented by processing, illustrated in FIG. 9, by the fourth flight control program used to take an evacuation action.

FIG. 10 is a conceptual diagram illustrating an example of the operation of the unmanned aerial vehicle 201, the operation being implemented by processing, illustrated in FIG. 9, by the fourth flight control program used to take an evacuation action. The hatched circular area illustrated in FIG. 10 represents the target area 401 for which an emergency warning is intended. The flight route of the unmanned aerial vehicle 201 before the update starts from a position of departure 901, passes through a pass-through position 902, and arrives at a destination 903. The flight route links a route 904, a route 905, and a route 906 together.

If the unmanned aerial vehicle 201 has already navigated the route 904 along the flight route before update and has arrived at a point 908 on the flight route, the unmanned aerial vehicle 201 abandons the navigation along the flight route before update because the pass-through position 902 yet to be passed is included in the target area 401 for which an emergency warning is intended, in which case the unmanned aerial vehicle 201 creates a new route 907 and updates the flight route with the route 907. The route 907 is a new flight route created in processing in step S701 to prevent the unmanned aerial vehicle 201 from passing through the target area 401, for which an emergency warning is intended, from the route 905 or 906.

In the above example, a case has been described in which there is only one pass-through position yet to be passed. If there are a plurality of pass-through positions yet to be passed, a decision is made for each pass-through position as to whether it is included in the target region for which an emergency warning is intended, a new route is created so that none of the pass-through positions yet to be passed are included in the target region for which an emergency warning is intended, and the previous flight route is updated with the new route.

As described above, by using the fourth flight control program used to take an evacuation action, if only a pass-through position is included in a target region for which an emergency warning is intended, the flight route is reviewed so that the unmanned aerial vehicle 201 does not pass through the target region for which an emergency warning is intended. Therefore, it is possible to appropriately evacuate the unmanned aerial vehicle 201 and lead it to the destination.

Example 5 of a Flight Control Program Used to Take an Evacuation Action

Figure 11:
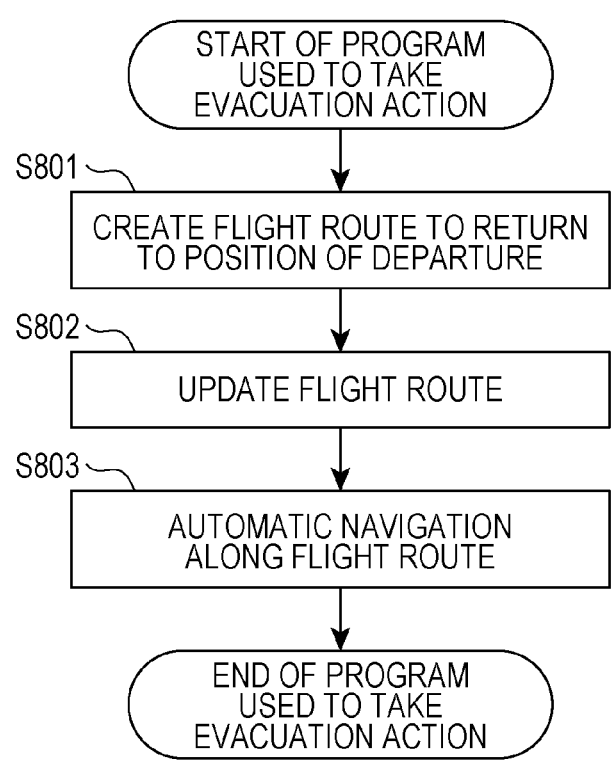
FIG. 11 is a flowchart illustrating an example of processing by a fifth flight control program used to take an evacuation action in the unmanned aerial vehicle illustrated in FIG. 8.

FIG. 11 is a flowchart illustrating an example of processing by a fifth flight control program used to take an evacuation action in the unmanned aerial vehicle 201 illustrated in FIG. 8. This processing is performed by a flight control program used to take an evacuation action, that is selected by the program selector 108 when the current position of the unmanned aerial vehicle 201 is not included in a target region for which an emergency warning is intended, the destination is included in the target region for which the emergency warning is intended, and the position of departure is not included in the target region for which an emergency warning is intended. Processing described below is executed by the program executor 106.

First, in the fifth flight control program used to take an evacuation action, the program executor 106 acquires position information from the position information storer 110 and acquires a regional code from the emergency warning receiver 111, after which the program executor 106 creates a new flight route along which the unmanned aerial vehicle 201 returns from the current position of the unmanned aerial vehicle 201 to the position of departure (step S801).

Next, the program executor 106 stores the new flight route in the flight route storer 202, and updates the flight route (step S802).

The program executor 106 then inputs a command to the propeller controller 104 so that the unmanned aerial vehicle 201 navigates along the updated flight route (step S803).

As described above, by using the fifth flight control program used to take an evacuation action, if only the destination is included in a target region for which an emergency warning is intended, the unmanned aerial vehicle 201 abandons an arrival at the destination and creates a new flight route along which the unmanned aerial vehicle 201 returns to the position of departure. Accordingly, it is possible to appropriately evacuate the unmanned aerial vehicle 201.

Example 6 of a Flight Control Program Used to Take an Evacuation Action

Figure 12:
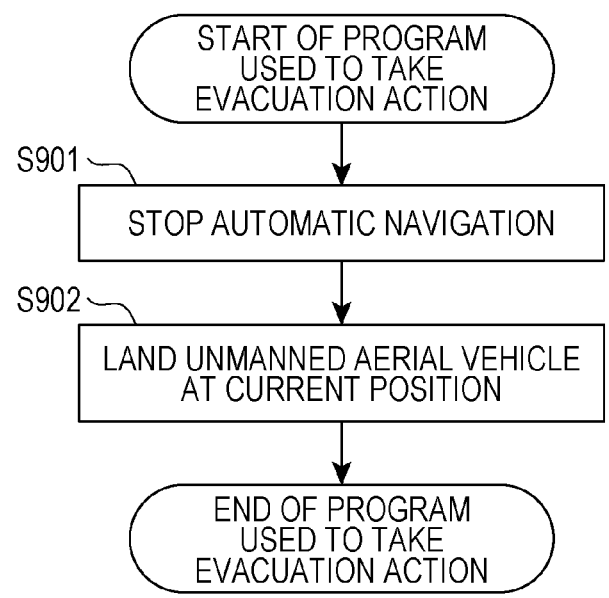
FIG. 12 is a flowchart illustrating an example of processing by a sixth flight control program used to take an evacuation action in the unmanned aerial vehicle illustrated in FIG. 8.

FIG. 12 is a flowchart illustrating an example of processing by a sixth flight control program used to take an evacuation action in the unmanned aerial vehicle 201 illustrated in FIG. 8. This processing is performed by a flight control program used to take an evacuation action, that is selected by the program selector 108 when both the position of departure and the destination are included in a target region for which the emergency warning is intended, regardless of whether the current position of the unmanned aerial vehicle 201 is included in the target region for which an emergency warning is intended. Processing described below is executed by the program executor 106.

First, in the sixth flight control program used to take an evacuation action, the program executor 106 inputs a command to the propeller controller 104 so that automatic navigation along the flight route stored in the flight route storer 202 is stopped (step S901).

The program executor 106 then inputs a command to the propeller controller 104 so that the unmanned aerial vehicle 201 lands at the current position of the unmanned aerial vehicle 201 (step S902).

As described above, by using the sixth flight control program used to take an evacuation action, if both the position of departure and the destination are included in a target region for which the emergency warning is intended, the return of the unmanned aerial vehicle 201 to the position of departure and the arrival of the unmanned aerial vehicle 201 at the destination are abandoned. Instead, the unmanned aerial vehicle 201 is landed at its current position. Accordingly, it is possible to avoid the unmanned aerial vehicle 201 from dropping.

Effects

According to processing described above, the unmanned aerial vehicle 201 can autonomously take an evacuation action by using Emergency Warning System. In this case, a regional code included in Emergency Warning System, that is, a target region for which an emergency warning is intended, is compared with the position of departure, pass-through position, and destination on the flight route, after which it is decided whether these positions are included in the target region. An appropriate flight control program used to take an evacuation action can be selected in accordance with the decision results. Therefore, the unmanned aerial vehicle 201 can take an appropriate action suitable to the emergency situation. In particular, even when the current position of the unmanned aerial vehicle 201 is not included in the target region for which an emergency warning is intended, if an evacuation action is taken, it is possible to appropriately evacuate the unmanned aerial vehicle 201.

The six flight control programs for evacuation described above are examples. Flight control programs for evacuation according to the embodiments are not limited to these programs. For example, if a newly created flight route is longer than a distance over which the unmanned aerial vehicle 201 can navigate at present, an evacuation action to, for example, land the unmanned aerial vehicle 201 land at its current position may be taken. If the current position of the unmanned aerial vehicle 201 is included in the target region for which an emergency warning is intended, a flight control program for evaluation that lands the unmanned aerial vehicle 201 immediately may be used.

The unmanned aerial vehicle according to the present disclosure has a function that autonomously takes an evacuation action at the time of an emergency. The unmanned aerial vehicle is useful as an unmanned aerial vehicle that is remotely controlled by the manipulator or as an unmanned aerial vehicle that autonomously flies in response to commands programmed in advance.

What is claimed is:

1. An unmanned aerial vehicle, the vehicle comprising:
   a memory that stores acquired first information and acquired second information, the first information indicating a current position of the unmanned aerial vehicle, the second information indicating a current position of a manipulation device that transmits a command to remotely manipulate the unmanned aerial vehicle;
   a receiver that receives information transmitted from a transmission source, the information including an emergency warning;
   a processor; and
   a controller that controls the unmanned aerial vehicle; wherein
   the processor compares a target region which is indicated in the information transmitted from the transmission source and for which the emergency warning is intended and the current position of the unmanned aerial vehicle and compares the target region and the current position of the manipulation device, and
   the controller controls the unmanned aerial vehicle to evacuate the unmanned aerial vehicle from the target region if the unmanned aerial vehicle is currently in the target region or controls the unmanned aerial vehicle to avoid the target region if the unmanned aerial vehicle is not currently in the target region in accordance with results of the comparisons.

2. The unmanned aerial vehicle according to claim 1, wherein:
   the transmission source includes a broadcast station;
   the information transmitted from a transmission source includes a broadcast wave; and
   the processor detects a start signal for the emergency warning and a regional code indicating the target region, the start signal and the regional code being included in the broadcast wave.

3. The unmanned aerial vehicle according to claim 1, wherein:
   the memory further stores a plurality of programs;
   the processor
   selects one program from the plurality of programs in accordance with the results of the comparisons, and
   executes the selected program; and
   in response to the selected program being executed, the controller evacuates the unmanned aerial vehicle from the target region if the unmanned aerial vehicle is currently in the target region or avoids the target region if the unmanned aerial vehicle is not currently in the target region.

4. The unmanned aerial vehicle according to claim 1, further comprising a manipulation-device receiver that receives the command from the manipulation device, wherein if the results of the comparisons indicate that the current position of the unmanned aerial vehicle is not included in the target region and the current position of the manipulation device is not included in the target region,
  the processor invalidates the command, and
  the controller causes the unmanned aerial vehicle to fly outside the target region.

5. The unmanned aerial vehicle according to claim 1, further comprising a manipulation-device receiver that receives the command from the manipulation device, wherein if the results of the comparisons indicate that the current position of the unmanned aerial vehicle is not included in the target region and the current position of the manipulation device is included in the target region,
  the processor determines whether the command has not been issued for a certain time period, and
  if the processor determines that the command has not been issued for the certain time period, the controller lands the unmanned aerial vehicle at the current position of the unmanned aerial vehicle.

6. The unmanned aerial vehicle according to claim 1, further comprising a manipulation-device receiver that receives the command from the manipulation device, wherein if the results of the comparisons indicate that at least the current position of the unmanned aerial vehicle is included in the target region, the processor
  invalidates the command, and
  determines whether a distance between the current position of the unmanned aerial vehicle and the current position of the manipulation device is larger than or equal to a predetermined value, and
  if the processor determines that the distance is larger than or equal to the predetermined value, the controller lands the unmanned aerial vehicle at the current position of the unmanned aerial vehicle, and
  if the processor determines that the distance is smaller than the predetermined value, the controller lands the unmanned aerial vehicle at the current position of the manipulation device.

7. A method of controlling an unmanned aerial vehicle, the method causing a processor to perform a method comprising:
  receiving, via a receiver, information transmitted from a transmission source, the information including an emergency warning;
  acquiring, from a memory, first information that indicates a current position of the unmanned aerial vehicle;
  acquiring, from the memory, second information that indicates a current position of a manipulation device that transmits a command to remotely manipulate the unmanned aerial vehicle;
  comparing, with the processor, a target region which is indicated in the information and for which the emergency warning is intended and the current position of the unmanned aerial vehicle and comparing the target region and the current position of the manipulation device; and
  causing a controller to control the unmanned aerial vehicle to evacuate from the target region if the unmanned aerial vehicle is currently in the target region or to control the unmanned aerial vehicle to avoid the target region if the unmanned aerial vehicle is not currently in the target region in accordance with results of the comparisons.

8. A non-transitory computer-readable recording medium storing a program that causes the processor to execute the method according to claim 7.

9. An unmanned aerial vehicle, the vehicle comprising:
  a memory that stores acquired first information and acquired second information, the first information indicating a current position of the unmanned aerial vehicle, the second information indicating a flight route of the unmanned aerial vehicle, the flight route including a position of departure, a pass-through position, and a destination;
  a receiver that receives information transmitted from a transmission source, the information including an emergency warning;
  a processor; and
  a controller that controls the unmanned aerial vehicle along the flight route; wherein
  the processor compares a target region which is indicated in the information transmitted from a transmission source and for which the emergency warning is intended and the current position of the unmanned aerial vehicle, compares the target region and the position of departure, compares the target region and the pass-through position, compares the target region and the destination, and compares the current position of the unmanned aerial vehicle and the pass-through position; and
  the controller controls the unmanned aerial vehicle to evacuate from the target region if the unmanned aerial vehicle is currently in the target region or to control the unmanned aerial vehicle to avoid the target region if the unmanned aerial vehicle is not currently in the target region in accordance with results of the comparisons.

10. The unmanned aerial vehicle according to claim 9, wherein:
  the transmission source includes a broadcast station;
  the information includes a broadcast wave including a start signal for the emergency warning and a regional code indicating the target region; and
  the processor detects the start signal and the regional code included in the broadcast wave.

11. The unmanned aerial vehicle according to claim 9, wherein:
  the memory further stores a plurality of programs;
  the processor
  selects one program from the plurality of programs in accordance with the results of the comparisons, and
  executes the selected program; and
  in response to the selected program being executed, the controller controls the unmanned aerial vehicle to evacuate from the target region if the unmanned aerial vehicle is currently in the target region or to control the unmanned aerial vehicle to avoid the target region if the unmanned aerial vehicle is not currently in the target region.

12. The unmanned aerial vehicle according to claim 9, wherein if the results of the comparisons indicate that the pass-through position is included in the target region, the unmanned aerial vehicle has not passed through the pass-through position, the current position of the unmanned aerial vehicle is not included in the target region, and the destination is not included in the target region,
  the processor creates a new flight route along which the unmanned aerial vehicle will arrive at the destination from the current position of the unmanned aerial vehicle without passing through the target region, and the controller causes the unmanned aerial vehicle to fly along the new flight route.

13. The unmanned aerial vehicle according to claim 9, wherein if the results of the comparisons indicate that at least the destination is included in the target region and the position of departure is not included in the target region, the processor creates a new flight route along which the unmanned aerial vehicle will arrive at the position of departure from the current position of the unmanned aerial vehicle, and the controller causes the unmanned aerial vehicle to fly along the new flight route.

14. The unmanned aerial vehicle according to claim 9, wherein if the results of the comparisons indicate that at least the position of departure and the destination are included in the target region, the controller controls the unmanned aerial vehicle to land at the current position of the unmanned aerial vehicle.

15. A method of controlling an unmanned aerial vehicle, the method causing a processor to perform a method comprising:

receiving, via a receiver, information transmitted from a transmission source, the information including an emergency warning;

acquiring, from a memory, first information that indicates a current position of the unmanned aerial vehicle;

acquiring, from the memory, second information that indicates a flight route of the unmanned aerial vehicle, the flight route including a position of departure, a pass-through position, and a destination;

comparing, with the processor, a target region which is indicated in the information and for which the emergency warning is intended and the current position of the unmanned aerial vehicle, comparing the target region and the position of departure, comparing the target region and the pass-through position, comparing the target region and the destination, and comparing the current position of the unmanned aerial vehicle and the pass-through position; and causing a controller to control the unmanned aerial vehicle to evacuate from the target region if the unmanned aerial vehicle is currently in the target region or to control the unmanned aerial vehicle to avoid the target region if the unmanned aerial vehicle is not currently in the target region in accordance with results of the comparisons.

16. A non-transitory computer-readable recording medium storing a program that causes the processor to execute the method according to claim 15.

* * * * *